(12) United States Patent
Turbell et al.

(10) Patent No.: US 9,014,999 B2
(45) Date of Patent: Apr. 21, 2015

(54) CALIBRATION OF A PROFILE MEASURING SYSTEM

(75) Inventors: Henrik Turbell, Linkoping (SE); Robert Andersson, Linkoping (SE)

(73) Assignee: Sick IVP AB, Linkoping (SE)

( * ) Notice: Subject to any disclaimer, the term of this patent is extended or adjusted under 35 U.S.C. 154(b) by 947 days.

(21) Appl. No.: 13/002,387

(22) PCT Filed: Jul. 2, 2009

(86) PCT No.: PCT/EP2009/058353
§ 371 (c)(1),
(2), (4) Date: Jul. 11, 2011

(87) PCT Pub. No.: WO2010/000818
PCT Pub. Date: Jan. 7, 2010

(65) Prior Publication Data
US 2011/0288806 A1 Nov. 24, 2011

(30) Foreign Application Priority Data
Jul. 4, 2008 (EP) ..................................... 08159722

(51) Int. Cl.
*G06F 19/00* (2011.01)
*G01B 11/25* (2006.01)
(Continued)

(52) U.S. Cl.
CPC .......... *G01B 11/2504* (2013.01); *G01B 21/042* (2013.01); *G06T 5/006* (2013.01)

(58) Field of Classification Search
USPC ........................................................ 702/104
See application file for complete search history.

(56) References Cited

U.S. PATENT DOCUMENTS

| 3,719,775 A | 3/1973 | Takaoka et al. |
| 3,976,384 A | 8/1976 | Matthews et al. |

(Continued)

FOREIGN PATENT DOCUMENTS

| CA | 2335784 A1 | 8/2001 |
| JP | 5503990 A | 6/1993 |
| WO | 2005/017450 | 2/2005 |

OTHER PUBLICATIONS

Luca Lucchese, Geometric calibration of digital cameras through multi-view rectification, q 2005 Elsevier B.V. All rights reserved doi: 10.1016/j.imavis.2005.01.001, p. 517-539.*
(Continued)

*Primary Examiner* — Tung S Lau
(74) *Attorney, Agent, or Firm* — Fish & Richardson P.C.

(57) ABSTRACT

A method for calibrating a measuring system, which system comprises a structured light source, optics and a sensor. The light source is adapted to produce a light plane or sheet and the optics is located between the light plane and the sensor. The method is performed in order to obtain a mapping from the sensor to the light plane. In the method the light source is switched on such that the light plane is produced. In order to account for distortions due to the optics, a mapping calibration profile is introduced in the light plane, wherein the mapping calibration profile comprises at least three points forming a straight line. A non-linear mapping from the sensor to the light plane is then computed by using the at least three points. Next, in order to account for perspective distortions, a homography calibration profile is introduced in the light plane, wherein the homography calibration profile comprises at least four points the relative distance between which are predetermined. A homography from the sensor to at the light plane based on these four points is then computed. A calibration object for using in such a method is also presented.

15 Claims, 7 Drawing Sheets

(51) Int. Cl.
*G01B 21/04* (2006.01)
*G06T 5/00* (2006.01)

(56) References Cited

U.S. PATENT DOCUMENTS

| | | |
|---|---|---|
| 4,168,489 A | 9/1979 | Ervin |
| 4,188,544 A | 2/1980 | Chasson |
| 4,826,299 A | 5/1989 | Powell |
| 4,984,172 A | 1/1991 | Luminari |
| 5,233,191 A | 8/1993 | Noguchi et al. |
| 5,274,244 A | 12/1993 | Johansson et al. |
| 5,327,254 A | 7/1994 | Daher |
| 5,347,311 A | 9/1994 | Golin |
| 5,487,172 A | 1/1996 | Hyatt |
| 5,490,100 A | 2/1996 | Kableshkov |
| 5,644,392 A | 7/1997 | Soest et al. |
| 5,703,960 A | 12/1997 | Soest |
| 5,831,748 A | 11/1998 | Tsukada et al. |
| 6,037,579 A | 3/2000 | Chan et al. |
| 6,064,747 A | 5/2000 | Wills et al. |
| 6,094,269 A | 7/2000 | Ben-Dove et al. |
| 6,097,849 A | 8/2000 | Nevis |
| 6,382,515 B1 | 5/2002 | Good et al. |
| 6,934,420 B1 | 8/2005 | Hsu et al. |
| 6,971,580 B2 | 12/2005 | Zhu et al. |
| 2004/0036891 A1 | 2/2004 | Lou et al. |
| 2004/0179719 A1 | 9/2004 | Chen et al. |
| 2005/0169529 A1 | 8/2005 | Owechko et al. |
| 2006/0147901 A1 | 7/2006 | Jan et al. |
| 2006/0151604 A1 | 7/2006 | Zhu et al. |

OTHER PUBLICATIONS

Robert Andersson, A calibration method for laser-triangulating 3D cameras, Linköping, Dec. 1, 2008, 70 pages.* http://www.techterms.com/definition/ccd, 1 page, printed Feb. 4, 2014.*

Z. Zhang, "A Flexible New Technique for Camera Calibration", Microsoft Research Technical Report MSR-TR-98-71 (Dec. 2, 1998, with last update Aug. 10, 2002); XP2372168.

B. Zhang, Y.F. Li, "An Efficient Method for Dynamic Calibration and 3D Reconstruction Using Homographic Transformation", Sensors and Actuators A 119 (2005) 349-357; XP4852173.

European Patent Office, International Preliminary Report on Patentability for Application PCT/EP2009/058353, dated Feb. 6, 2010, 11 pages.

Astrand Erik, "Automatic Inspection of Sawn Wood", Linkoping Studies in Science and Technology, Dissertations No. 424, University of Linkoping, 1996, pp. 51-66.

Wendt, "Stack Filters", IEEE Transactions on Acoustics, Speech, and Signal Processing, vol. ASSP-34, No. 4, Aug. 1986, pp. 898-911.

Mattias Forslund; Utvardering Av Ny Teknik Vid Dimensionsmatning Av Sagtimmer; Dec. 2000; 5 pages, and English Translation (4 pages).

* cited by examiner

CALIBRATION OF A PROFILE MEASURING SYSTEM

CROSS-REFERENCE TO RELATED APPLICATIONS

This application is a filing under 35 U.S.C. §371 based on PCT/EP2009/058353, filed on Jul. 2, 2009, which claims priority to European Patent Convention Application No. 08159722.1, filed on Jul. 4, 2008, each of which applications are incorporated herein in their entirety.

TECHNICAL FIELD

The present invention relates to a method for calibrating a measuring system, which system comprises a light source, optics and a sensor. The light source is adapted to produce a light plane and the optics is located between the light plane and the sensor. The method is performed in order to obtain a mapping from at least one point on the sensor to at least one point in the light plane. The method comprises the steps of: switching on the light source such that the light plane is produced and introducing a mapping calibration profile in a first mapping position in the light plane, wherein the mapping calibration profile comprises at least three points forming a straight line.

The present invention also relates to a calibration object which may be used in such calibration methods.

BACKGROUND OF THE INVENTION

In order to measure the dimensions of a profile of an object, a range camera may be used. A range camera typically comprises a light source and a sensor wherein the light source is adapted to produce a light plane on the object to be measured. Furthermore, optics is generally located between the sensor and the object for focusing light reflected from the object onto the sensor. The light source, the object and the sensor are generally located at a distance from one another such that they each form a corner of an imaginary triangle.

The sensor extends in a sensor plane and as may be realized by a person skilled in the art, in order to be able to determine the dimensions of the profile, there is a need for a mapping from points in the sensor plane to points in the light plane such that coordinates in the sensor planes may be translated to real world coordinates. The process of obtaining such a mapping is generally referred to as a calibration of the range camera. Due to inter alia an unknown scale of the mapping, an unknown perspective distortion of the light plane in relation to the sensor and an unknown distortion of the aforementioned optics, such a calibration is generally determined by means of measurements of a reference object.

To this end, prior art proposes various ways of performing the aforesaid calibration. For instance, a document by Z. Zhang named "A flexible new technique for camera calibration." IEEE Transactions on Pattern Analysis and Machine Intelligence, 22(11):1330-1334, 2000, proposes that a two-dimensional pattern, such as a checkerboard, is placed in the presumed extension of the light plane, although the light source has been turned off. The pattern may be placed in at least two positions, wherein at least one of the positions is in the extension of the light plane, such that a calibration may be performed. However, since the light source has been turned off during the calibration procedure as proposed hereinabove, there is of course a risk that the pattern is unintentionally positioned outside the extension of the light plane, which will impair the result of the calibration. Moreover, the aforesaid method is based on the assumption that the light plane produced by the light source is perfectly planar, which is not always necessarily true, and this assumption may also impair the result of the calibration procedure.

Alternatively, prior art teaches that a calibration object may be placed in a plurality of predetermined positions in the light plane and a mapping from the sensor plane to the light plane is performed by using images of the plurality of positions as well as information as regards the aforesaid positions. However, such a calibration procedure requires that the positions of the calibration object may be determined appropriately accurately, which generally results in that the positioning of the calibration object is performed by using a motion rig. Apart from being expensive and cumbersome to use, the motion rig also has the disadvantage that it requires space around the light plane, which space is not always available due to e.g. space limitations close to the range camera.

As may be realized from the above, there is a need for further improvements of calibration procedures for range cameras which removes at least one of the disadvantages of the prior art calibration procedures defined hereinabove.

SUMMARY OF THE INVENTION

A first object of the present invention is to provide a range camera calibration method which does not require the use of a motion rig.

A second object of the present invention is to provide a range camera calibration method which may take into account the extension of a light plane produced by the range camera.

A third object of the present invention is to provide a range camera calibration method which may take into account a linear as well as a non-linear mapping from a sensor plane to a light plane of the range camera.

A fourth object of the present invention is to provide a range camera calibration method which may be used for calibrating a range camera providing a large light plane.

At least one of the aforementioned objectives is achieved by a method for calibrating a measuring system according to claim 1.

As such, the invention relates to a method for calibrating a measuring system, which system comprises a light source, optics and a sensor. The light source is adapted to produce a light plane and the optics is located between the light plane and the sensor. The method is performed in order to obtain a mapping from at least one point on the sensor to at least one point in the light plane and the method comprises the steps of:
  switching on the light source such that the light plane is produced, and
  introducing a mapping calibration profile in a first mapping position in the light plane, wherein the mapping calibration profile comprises at least three points forming a straight line.

According to the invention, the method further comprises the steps of:
  computing a non-linear mapping from at least a first portion of the sensor to at least a first portion of the light plane by using the at least three points of the mapping calibration profile;
  introducing a homography calibration profile in a first homography position in the light plane, wherein the homography calibration profile comprises at least four points the relative distance between which is predetermined, and computing a homography from at least a first portion of the sensor to at least a first portion of the light plane based on the at least four points of the homography calibration profile.

Thus, since the method of the present invention only requires information as regards relative distances between points on calibration profiles, the need for a controlled positioning of the calibration profiles has been reduced and may even be removed. Moreover, since the mapping calibration profile as well as the homography calibration profile is introduced in the actual light plane, there is no risk that the a mapping is determined with respect to a fictive plane which is not in the light plane as may be the case when using the calibration method as proposed by Z. Zhang as discussed hereinabove.

According to an embodiment of the calibration method of the invention, the method further comprises the steps of:
  altering the position of the mapping profile to successive mapping positions, and
  using information as regards the at least three points of the mapping calibration profile from each one of the successive mapping positions in order to compute the non-linear mapping.

Altering the position of the mapping profile and using data as regards each one of the positions when determining the non-linear mapping increases the accuracy of the non-linear mapping. It also makes it possible to cover the complete field-of-view with calibration measurements even in cases where the field-of-view is larger than the calibration object.

According to another embodiment of the calibration method of the invention, the step of altering the position of the mapping profile to the plurality of successive mapping positions is performed such that the successive mapping positions are selected randomly. As such, since the mapping positions may be selected randomly, there is no need for a controlled positioning of the mapping profile which indicates that the successive mapping positions may be obtained in a simple manner, for instance by simply changing the position of the mapping profile by hand.

According to another embodiment of the calibration method of the invention, the method further comprises the steps of:
  altering the position of the homography profile to successive homography positions, and
  using information as regards the at least four points of the homography calibration profile from each one of the successive homography positions in order to compute the homography.

As for the non-linear mapping, this increases the accuracy of the homography. According to another embodiment of the calibration method of the invention, the step of altering the position of the homography profile to the plurality of successive homography positions is performed such that the successive homography positions are selected randomly.

According to another embodiment of the calibration method of the invention, the mapping calibration profile comprises a planar surface on which the at least three points are located.

According to another embodiment of the calibration method of the invention, the homography calibration profile comprises a saw-toothed portion with predetermined dimensions, wherein at least four points are located on the saw-toothed portion.

According to another embodiment of the calibration method of the invention, the homography calibration profile extends in a longitudinal and a vertical dimension forming an profile calibration plane, wherein the profile calibration plane is adapted to be substantially parallel with the light plane when the homography profile is in a homography position, the homography calibration profile further extending in a transversal dimension being substantially perpendicular to the profile calibration plane, the homography calibration profile further comprising at least three two straight control lines, wherein each one of the control lines forms an angle with said transversal dimension, the method further comprising a step of determining a measure of a profile tilt of the profile calibration plane in relation to the light plane by utilizing the control lines.

According to another embodiment of the calibration method of the invention, the method further comprises a step of compensating for the profile tilt when computing the homography.

According to another embodiment of the calibration method of the invention, the optics comprises an optical axis and the sensor extends in a plane with a sensor normal direction and wherein the optical axis forms a Scheimpflug angle with the sensor normal direction, wherein the method further comprises a step compensating for the Scheimpflug angle when generating the mapping from at least one point on the sensor to at least one point in the light plane.

According to another embodiment of the calibration method of the invention, the light source is a laser source such that the light plane is a laser plane.

According to another embodiment of the calibration method of the invention, the mapping calibration profile and the homography calibration profile are located on a single calibration object.

A second aspect of the invention relates to a computer program product comprising a computer program containing computer program code executable in a computer or a processor to implement the steps of a method of the present invention, said product being stored on a computer-readable medium or a carrier wave.

A computer program may comprise computer program code executable in a computer or a processor, with the computer program being adapted to receive a signal from a sensor and to implement the computing steps of a method like the ones described above, wherein the computer program is storable on a computer-readable storage medium or distributable by a carrier wave.

A third aspect of the invention relates to an electronic control unit comprising a computer program product according the second aspect of the present invention and arranged to execute a calibration method according to the present invention.

A fourth aspect of the present invention relates to a measuring system comprising a first light source, a sensor and an electronic control unit according to the third aspect of the present invention.

A fifth aspect of the invention relates to a calibration object comprising a homography calibration profile which in turn comprises a saw-toothed portion comprising a plurality of teeth. Each one of the teeth comprises a base portion which extends in a calibration plane towards a peak portion and the calibration object further has a transversal dimension extending substantially perpendicularly to the calibration plane. According to the second aspect of the present invention the homography calibration profile further comprises at least two control lines, each one of the control lines forming an angle with the transversal dimension.

According to an embodiment of the fifth aspect of the present invention, the at least two control lines are located between the base portion and the peak portion of the teeth.

According to another embodiment of the fifth aspect of the present invention, each one of the at least two control lines is located on the peak portion of one of the teeth such that the peak portion has an extension which forms an angle with the transversal dimension.

BRIEF DESCRIPTION OF THE DRAWINGS

The present invention will hereinafter be further explained by means of non-limiting examples with reference to the appended figures wherein.

DETAILED DESCRIPTION OF PREFERRED EMBODIMENTS

The invention will, in the following, be exemplified by embodiments. It should however be realized that the embodiments are included in order to explain principles of the invention and not to limit the scope of the invention, defined by the appended claims.

Figure 1:
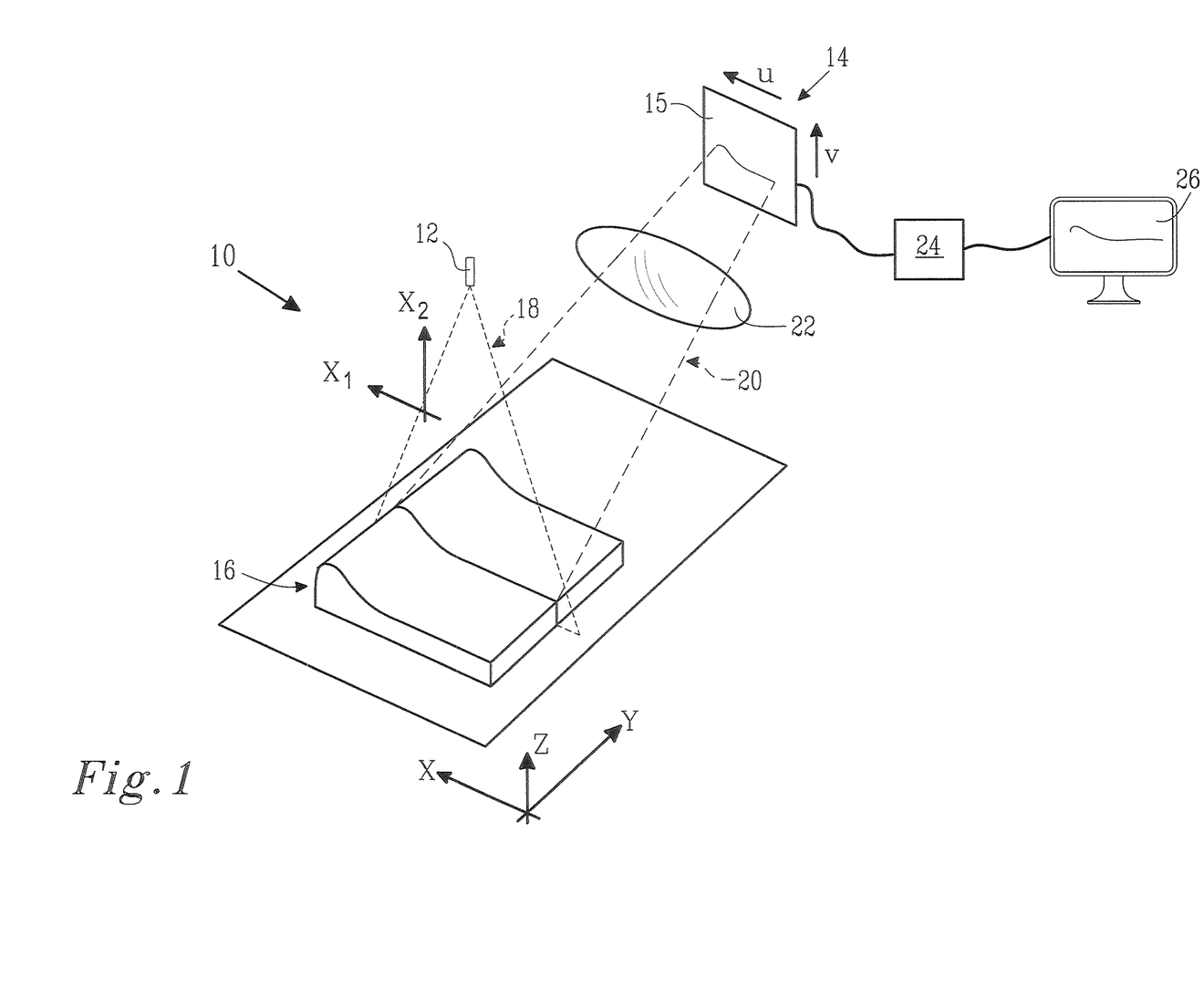
FIG. 1 is a schematic perspective view of a measuring system of a range type.

FIG. 1 illustrates a measuring system 10 of a range type. The system 10 comprises a light source 12 and a sensor 14. The light source 12 is adapted to illuminate a measure object 16 with an incident light plane 18 which light plane may also be referred to as a sheet of light. The sensor 14 is adapted to detect reflected light 20 from the measure object 16 and generate images based on the reflected light 20. Furthermore, the system 10 preferably comprises optics 22, adapted to be located between the sensor 14 and the measure object 16. The optics 22 is in FIG. 1 schematically illustrated as one single lens although other optics arrangements are of course feasible. Furthermore, the measuring system is preferably provided with an electronic control unit 24 adapted to store and/or analyze images recorded by the sensor 14. Preferably, the system also comprises viewing means 26, e.g. a display device, adapted to display the recorded images and/or images generated by the electronic control unit 24. Further illustrated in FIG. 1 is a global, or real world, coordinate system having an X, Y and Z dimension, respectively.

The light source 12 is adapted to generate the light plane 18, or a sheet of light, and may be of any type suitable for the application, for example a laser, a light-emitting diode (LED), ordinary light (light bulb) etc, which are familiar to the person skilled in the art and will not be described further herein. However, the light source 12 is preferably adapted to produce a laser light such that the light plane 18 is a laser plane. Furthermore, FIG. 1 illustrates that the light plane 18 extends along a first and a second light plane dimension $X_1$, $X_2$. In the example illustrated in FIG. 1, the first light plane dimension $X_1$ is parallel to the X-dimension and the second light plane dimension $X_2$ is parallel to the Z-dimension of the global coordinate system. However, in other implementations of the measuring system illustrated in FIG. 1, the light plane 18 may be oriented such that it is not parallel to any one of the X, Y and Z dimensions.

During operation, the measure object 16 generally moves along a first direction of movement, being the Y-direction in FIG. 1, in relation to the measuring system 10. To this end, the measure object 16 may e.g. be placed on a conveyor belt (not shown) or any similar arrangement. Optionally, the measure object 16 may be stationary and the measuring system 10 is instead adapted to move in relation to the measure object 16. Naturally, combinations of the two alternatives above are of course also possible.

The sensor 14 is preferably a CMOS sensor, but a person skilled in the art will appreciate that the invention may be applied to other types of sensors, such as CCD sensors or any other sensor suitable for generating images of an object, based on the light reflected from the same. As may be gleaned from FIG. 1, the sensor 14 generally extends in a sensor plane having a sensor longitudinal dimension v and a sensor transversal dimension u. The sensor transversal dimension u is preferably substantially perpendicular to the first direction of movement Y.

As may be realized by a person skilled in the art, in order to obtain the correct global coordinates, i.e. the coordinates in the X, Y and Z dimensions, of the object 16 based on information obtained from the sensor 14, there is a need for a mapping from the sensor dimensions u, v to the X, Y and Z dimensions. However, it should be noted that a mapping from the light plane 18 to the X, Y and Z dimensions may be easily obtained using traditional mapping techniques since such a mapping simply relates to mapping points on a plane, the orientation of which in the global coordinate system is known, to the X, Y and Z dimensions. As such, the mapping method according to the present invention and as presented hereinbelow may preferably be reduced to a method for obtaining a mapping from coordinates in the sensor dimensions u, v to corresponding coordinates in the light plane dimensions $X_1$, $X_2$, i.e. a mapping from the sensor plane 15 to the light plane 18.

As regards the mapping from the sensor plane 15 to the light plane 18, such a mapping may be regarded as comprising three sub-mappings, namely a homography, or linear mapping, H a non-linear mapping D and an intrinsic parameters mapping K. As such, for a point X in the light plane 18, the corresponding point u in the sensor plane 15 may be formulated as:

$$u \sim KD(HX) \qquad \text{Eq. 1}$$

Once the mapping according to Eq. 1 has been obtained, the expression as defined therein may be inversed such that a mapping from the sensor plane 15 to the light plane 18 is obtained, viz.

$$X \sim H^{-1}D^{-1}(K^{-1}(u)). \qquad \text{Eq. 2}$$

As may be realized from the above, there is a need for determining the sub-mappings K, D and H in order to obtain the mapping as defined in either one of Eq. 1 or Eq. 2.

In many applications, the intrinsic parameters mapping K may be assumed to be a unity mapping, i.e. K=I without impairing the result of the calibration. Using the aforesaid assumption, the mapping of a point X in the light plane 18 to the corresponding point u in the sensor plane 15 may be formulated as:

$$u \sim D(HX) \qquad \text{Eq. 3}$$

and $$X \sim H^{-1}D^{-1}(u). \qquad \text{Eq. 4}$$

As will be apparent from the description hereinbelow, certain embodiments of the present invention also address situations wherein the intrinsic parameters mapping K is actually taken into account.

Figure 2:
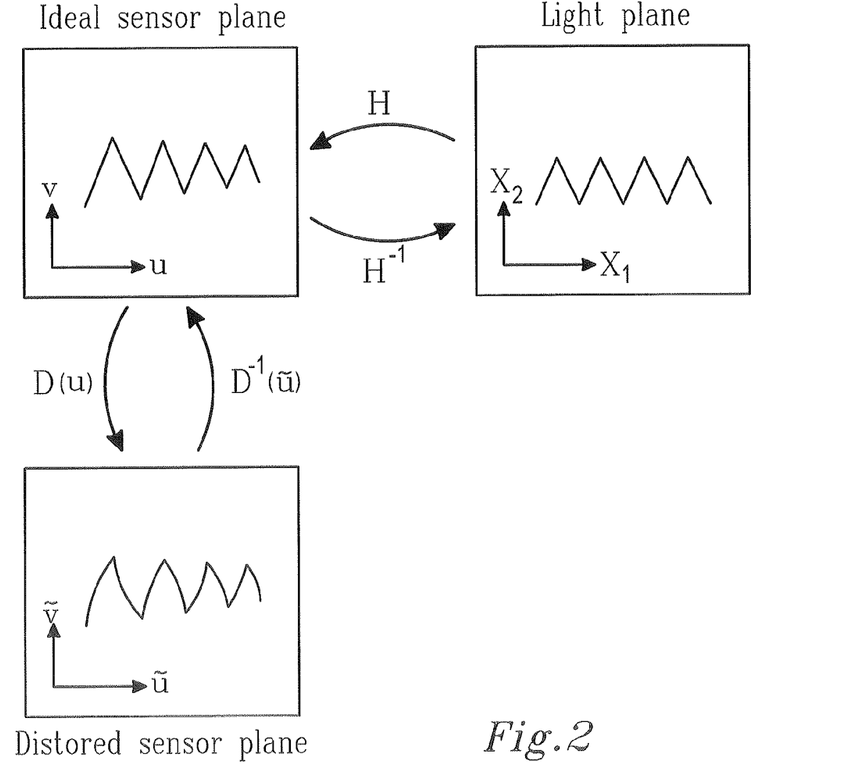
FIG. 2 is a schematic flow chart of mappings obtained from the method of the present invention.

The mapping from the light plane 18 to the sensor plane 15 as stipulated by Eq. 3 is illustrated in FIG. 2, wherein the mappings D and H are illustrated. As such, the homography, or linear mapping, H maps the light plane 18 to a fictive ideal sensor plane with dimensions u, v and the non-linear mapping D in turn maps the ideal sensor plane to a distorted sensor plane with dimensions ũ, ṽ, which distorted sensor plane is the same as the actual sensor plane 15 in this case since no intrinsic parameters mapping K is considered. The nomenclature as defined hereinabove as regards the planes and the mappings will adhere to the description hereinbelow unless specified otherwise.

In order to determine the mappings D and H, the present invention proposes a method for calibrating a measuring system, which method comprises the steps of:

switching on the light source 12 such that the light plane 18 is produced;

introducing a mapping calibration profile 28 in a first mapping position in the light plane 18, wherein the mapping calibration profile 28 comprises at least three points forming a straight line;

computing a non-linear mapping $D^{-1}$ from at least a first portion of the sensor 14 to at least a first portion of the light plane 18 by using the at least three points of the mapping calibration profile 28;

introducing a homography calibration profile 32 in a first homography position in the light plane 18, wherein the homography calibration profile 32 comprises at least four points the relative distance between which are predetermined, and computing a homography $H^{-1}$ from at least a first portion of the sensor 14 to at least a first portion of the light plane 18 based on the at least four points of the homography calibration profile 32.

The method as defined hereinabove will be explained in detail below, starting with the steps of the method relating to the non-linear mapping.

A non-linear mapping is needed for a measuring system 10 as illustrated in FIG. 1 due to inter alia the fact that the optics 22 will introduce distortions of the reflected light 20 from the measure object 16 to the sensor 14. Such distortions may arise due to irregularities in the optics 22, e.g. due to manufacturing tolerances of lenses of the optics, but may also arise due to the fact that the shapes of the lenses constituting the optics generally are curved, e.g. convex, which automatically results in a non-linear transformation of the reflected light 20 when passing through the optics 22.

Figure 3:
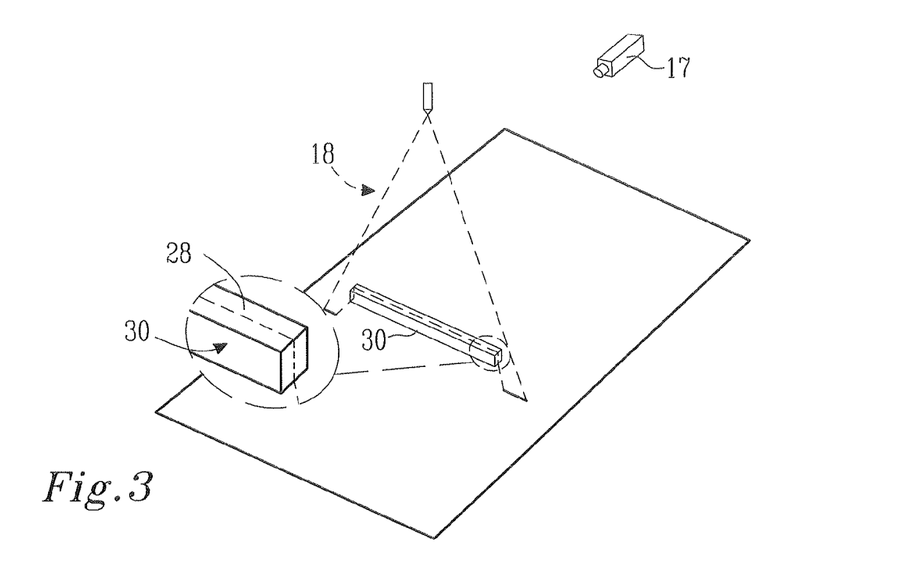
FIG. 3 is a schematic perspective view of the FIG. 1 measuring system when a step of determining a non-linear mapping is performed.

FIG. 3 illustrates the FIG. 1 measuring system 10 wherein a mapping calibration profile 28 has been introduced in the light plane 18. Furthermore, the optics and the sensor of the measuring system are in FIG. 3 illustrated by one single unit 17. In FIG. 3, the mapping calibration profile 28 is located on a mapping calibration object 30. The mapping calibration profile 28 comprises at least three points forming a straight line and in the implementation of the mapping calibration profile 28 illustrated in FIG. 3, the mapping calibration profile 28 in fact comprises a planar surface such that the mapping calibration profile 28 in this case comprises a continuous straight line. However, it should be noted that other implementations of the mapping calibration profile 28, for instance profiles 28 comprising three or more points constituting discrete points on a straight line (not shown), may also be feasible when determining the non-linear mapping.

Figure 4A:
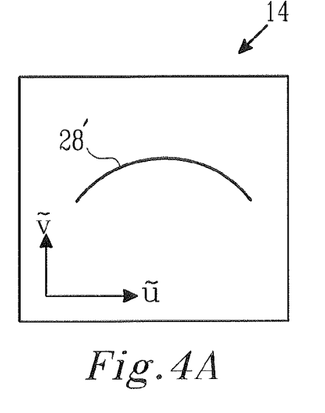
FIGS. 4A and 4B illustrate an image of a straight profile before and after a non-linear mapping has been performed.

FIG. 4A illustrates how the mapping calibration profile 28 illustrated in FIG. 3 is imaged on the sensor 14 if the reflected light 20 is subjected to non-linear transformation before impacting the sensor 14. As may be gleaned from FIG. 4A, the non-linear transformation results in that the straight line of the mapping calibration profile 28 is imaged as a curved line 28' on the sensor 14. Thus, there is a need for a non-linear transformation of the image illustrated in FIG. 4A such that the mapping calibration profile 28 is instead imaged as a straight line 28", as illustrated in FIG. 4B.

Figure 4B:
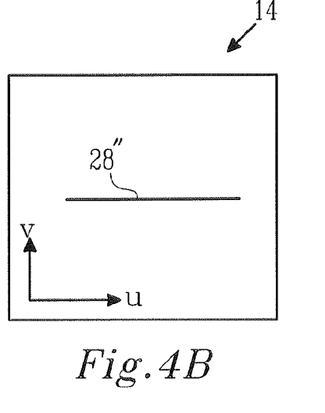

Depending on the non-linear phenomena considered when determining a non-linear transformation, such as the one from FIG. 4A to FIG. 4B, the mapping may vary. Purely by way of example, should a lens distortion be modeled, the non-linear mapping may be determined according to the following. First of all, a distorted sensor plane is defined having a distortion dimensions ũ and ṽ, c.f. FIG. 4A, and a transformation from the distorted sensor plane to the ideal sensor plane may be formulated as:

$$u = \tilde{u} + F_D(\tilde{u}, \delta), \qquad \text{Eq. 5}$$

wherein $$F_D(\tilde{u}, \delta) = \begin{bmatrix} \hat{u}(k_1 r^2 + k_2 r^4) + (2p_1 \hat{u}\hat{v} + p_2(r + 2\hat{u}^2)) \\ \hat{v}(k_1 r^2 + k_2 r^4) + (p_1(r^2 + 2\hat{v}^2) + 2p_2 \hat{u}\hat{v}) \end{bmatrix}, \qquad \text{Eq. 6}$$

and $$\hat{u} = \tilde{u} - \tilde{u}_0, \hat{v} = \tilde{v} - \tilde{v}_0, r = \sqrt{\hat{u}^2 + \hat{v}^2},$$

$$\delta = [k_1, k_2, p_1, p_2, \tilde{u}_0, \tilde{v}_0]^T$$

wherein $\tilde{u}_0$ and $\tilde{v}_0$ define a distortion centre in the distorted sensor plane coordinates.

Thus, establishing a transformation from the distorted sensor plane to the ideal sensor plane may be regarded as determining appropriate values of the parameters of δ. Purely by way of example, appropriate values of the parameters of δ may be obtained by utilizing an optimization procedure which selects the parameters of δ resulting in as straight a line 28" as possible in the ideal sensor plane.

To this end, a straightness measure MS relating to the straightness of the line 28" is needed, which straightness measure MS may be analysed in order to obtain a preferred set of the parameters of δ. In this respect, the inventors of the present invention have realized that if the line 28" is assumed to be constituted by a plurality of points {p$_i$}—and this assumption is always possible to make—an appropriate straightness measure may be defined according to the following:

$$MS = \frac{\lambda_2}{\lambda_1},\qquad\text{Eq. 7}$$

wherein $\lambda_1$ is the variance of the coordinates of the points {p$_i$} in a principal direction, which principal direction is a direction in the ideal sensor plane resulting in the largest variance of the points {p$_i$}, and $\lambda_2$ is the variance of the coordinates of the points {p$_i$} in a direction orthogonal to the principal direction.

As may be realized from the definition of the straightness measure MS hereinabove, a perfectly straight line has straightness measure MS of zero whereas a line in the shape of a semi circle will have a straightness measure MS of 0.5. Moreover, a person skilled in the art may realize that a procedure for obtaining appropriate values of the parameters of δ may be formulated as a minimization problem, viz.

$$\min_{\delta} MS.\qquad\text{Eq. 8}$$

Figure 5A:
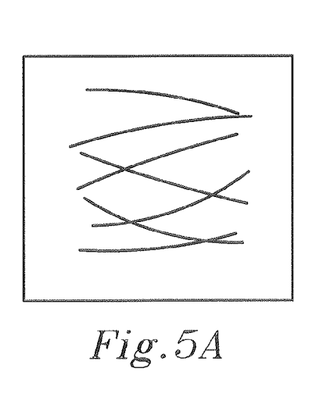
FIGS. 5A and 5B illustrate an image of a plurality of straight profiles before and after a non-linear mapping has been performed.
Figure 5B:
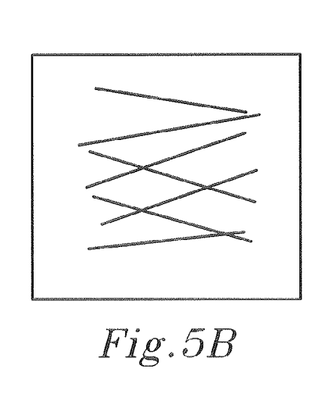

The presentation above of the procedure of obtaining appropriate values of the parameters of δ has been limited to one line 28" in the ideal sensor plane. However, in order to increase the accuracy of the non-linear mapping, the procedure may preferably be performed for a plurality of lines instead as illustrated in FIG. 5A and FIG. 5B. Thus, images are generated of the mapping calibration profile 28 when the profile 28 is located in a plurality of different positions in the light plane 18, resulting in a plurality, i.e. a number of m lines in the ideal sensor plane, c.f. FIG. 5A. Utilizing the lines in FIG. 5A, a combined straightness measure MS may be formulated for all of the lines in terms of:

$$MS = \sum_{i=1,m} \frac{\lambda_2^i}{\lambda_1^i}\qquad\text{Eq. 9}$$

As such, a preferred embodiment of the method of the present invention further comprises the steps of:
  altering the position of the mapping profile 28 to successive mapping positions, and
  using information as regards said at least three points of said mapping calibration profile 28 from each one of said successive mapping positions in order to compute said non-linear mapping.

Since only the straightness measure MS is used when determining appropriate parameters of δ, the inventors of the present invention have realized that the step of altering the position of the mapping profile to the plurality of successive mapping positions may be performed such that the successive mapping positions are selected randomly.

Now, the part of the method of the present invention relating to determining a homography, or a linear mapping, between the light plane and the sensor plane is presented.

Figure 6:
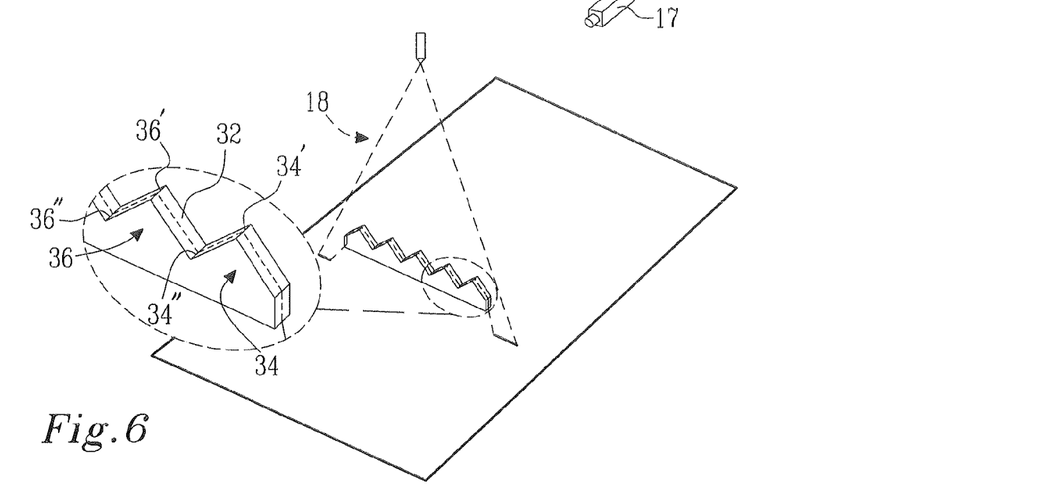
FIG. 6 is a schematic perspective view of the FIG. 1 measuring system when a step of determining a linear mapping is performed.

FIG. 6, illustrates a measuring system 10 wherein a homography calibration profile 32 has been introduced in a first homography position in the light plane 18. The homography calibration profile 32 comprises at least four points the relative distance between which is predetermined. In the example illustrated in FIG. 6, the homography calibration profile 32 comprises a saw-toothed portion with a plurality of teeth 34, 36 wherein each one of the teeth has a peak 34', 36' and wherein a valley 34" is formed between two adjacent teeth 34, 36. As such, the homography calibration profile 32 illustrated in FIG. 6 comprises a plurality of points the relative distance between which is predetermined.

As may be realized by a person skilled in the art, a homography may be regarded as a linear mapping from the light plane 18 to the sensor plane 15. Should the position of the homography calibration profile 32 in the light plane 18 be known, such that the position of at least four points on the profile 32 is known in the light plane 18, it would actually be possible to determine the linear mapping as:

$$u \sim HX,\qquad\text{Eq. 10}$$

by using techniques known to a person skilled in the art, such as for instance a direct linear transformation technique. In Eq. 10, u defines the coordinates in the sensor plane, X defines the coordinates in the light plane and H is the homography matrix, or linear mapping matrix H which generally may be formulated according to the following:

$$H = \begin{bmatrix} h_{11} & h_{12} & h_{13} \\ h_{21} & h_{22} & h_{23} \\ h_{31} & h_{32} & h_{33} \end{bmatrix}\qquad\text{Eq. 11}$$

What the inventors of the present invention have realized is that the exact position of the homography calibration profile 32 in the light plane 18 does not need to be known in order to determine the homography. Instead, it may simply be assumed that the homography calibration profile 32 is placed with its center in the origin of the light plane 18 and is rotated in a fixed way such that X̃ defines the coordinates of the homography calibration profile 32. As such, the relationship between X̃ and X may be formulated as $$\tilde{X} \sim TRX,\qquad\text{Eq. 12}$$

wherein R relates to a rotation of the homography calibration profile 32 and T relates to a translation of the homography calibration profile 32

It is then possible to calculate a homography H̃ that maps the assumed coordinates X̃ in the light plane 18 to the sensor coordinates u such that:

$$u \sim \tilde{H}\tilde{X}.\qquad\text{Eq. 13}$$

Utilizing the relationship between X̃ and X as defined hereinabove, the expression may be reformulated to:

$$u \sim \tilde{H}TRX,\qquad\text{Eq. 14}$$

which results in that the homography may be reformulated as $$H = \tilde{H}TR.\qquad\text{Eq. 15}$$

If the coordinates in the sensor plane are fixed in relation to the laser plane, it is actually possible to fully determine the operator H such that a coordinate in the sensor plane maps to the correct real world coordinates by utilizing the inverse $H^{-1}$ of the operator H. Purely by way of example, a fixed relationship between the sensor plane and the laser plane may be obtained by placing the homography calibration profile 32 in a predetermined position in the laser plane, for example on a specific location on the conveyor belt (not shown) such that a known position in the laser plane is used for fully determining the operator H. To this end, the origin $X_0$ of the laser plane coordinate system may be determined as well as an additional point $X_r$ on the $X_1$-axis. Knowing $X_0$, the projection to the sensor plane may be formulated as:

$$u_0 \simeq HX_0. \qquad \text{Eq. 16}$$

As such, the following relation may be formulated:

$$u_0 \simeq \tilde{H}TRX_0 \Rightarrow \tilde{H}^{-1}u_0 \simeq TRX_0 \qquad \text{Eq. 17}$$

It should be noted, that since the both the $X_1$ and $X_2$ equal zero in the origin $X_0$, any rotation as described by the matrix R will not effect the position of the origin $X_0$ and may thus be chosen as an identity operator in this case such that R=I.

Now, a translation vector d is defined as:

$$d \simeq \tilde{H}^{-1}u_0, \qquad \text{Eq. 18}$$

which results in that T will assume the following form:

$$T = \begin{bmatrix} 1 & 0 & \vdots \\ 0 & 1 & d \\ 0 & 0 & \vdots \end{bmatrix}. \qquad \text{Eq. 19}$$

A similar approach as described hereinabove with respect to the translation matrix T may be used when determining the rotation matrix R. However, in this case the additional point $X_r$ on the $X_1$-axis is used instead. As such, if the additional point $X_r$ is assumed to be projected to the point $u_r$ on the ideal sensor plane, the following relation may be formulated:

$$\tilde{H}^{-1}u_r \simeq TRX_r \Rightarrow T^{-1}\tilde{H}^{-1}u_r \simeq RX_r. \qquad \text{Eq. 20}$$

As previously discussed, it is known that $X_2=0$ for the additional point $X_r$ and using this information, the angle of rotation $\phi$ between the $X_1$-axis and a vector r may be determined wherein:

$$r = \begin{bmatrix} r_{X_1} \\ r_{X_2} \\ 1 \end{bmatrix} = T^{-1}\tilde{H}^{-1}u_r. \qquad \text{Eq. 21}$$

The aforesaid angle of rotation $\phi$ may be determined by the following relation:

$$\phi = \arctan\left(\frac{r_{X_2}}{r_{X_1}}\right). \qquad \text{Eq. 22}$$

Once the angle of rotation has been determined, the rotation matrix R may be calculated according to the following:

$$R = \begin{bmatrix} \cos(\phi) & -\sin(\phi) & 0 \\ \sin(\phi) & \cos(\phi) & 0 \\ 0 & 0 & 1 \end{bmatrix}. \qquad \text{Eq. 23}$$

As such, the homography matrix H may now be determined by the following relation:

$$H = \tilde{H}TR \qquad \text{Eq. 24}$$

As may be realized when studying the teachings presented with respect to Eq. 12 to Eq. 24 hereinabove, the inventors have realized that using information as regards the exact location of the homography calibration profile 32 in the light plane 18 is not necessary when determining the homography. Instead, using the technique as presented hereinabove, the homography calibration profile 32 may be placed at an arbitrary position in the light plane 18 and the relation between the position of the homography calibration profile 32 and the $X_1$ and $X_2$ dimensions of the light plane 18 may be determined by Eq. 12. Once this relation has been established, the mapping $\tilde{H}$ as discussed hereinabove may be determined using conventional methods, such as for instance a direct linear transformation technique, utilizing the predetermined information as regards relative distance between the four points of the homography calibration profile 32. The homography matrix H may then be determined by Eq. 24.

As for the transformation from the distorted sensor plane to an undistorted sensor plane as previously discussed, the aforesaid homography may be determined for a plurality of successive homography positions 1-n such that a plurality of homography matrices $\{H_i\}_{i=1,n}$ generated. This generation may be performed by generating images of the homography calibration profile 32 when the profile 32 is in a plurality, namely n, of separate positions in the light plane 18. As for the non-linear mapping, the separate positions in the light plane may be selected randomly. The plurality of homography matrices $\{H_i\}_{i=1,n}$ may then be assembled such as to form one single homography matrix H. Such an assembly may be performed in a plurality of ways, a few examples of which are presented hereinbelow.

A first example of how to assemble the homography matrices $\{H_i\}_{i=1,n}$ is based on forming means of the elements of the matrices $\{H_i\}_{i=1,n}$ in order to generate one single homography matrix H. To this end, each one of the homography matrices $\{H_i\}_{i=1,n}$ is preferably firstly normalized, e.g. such that $h_{33}^i=1$ i=1 . . . n. Each element $h_{jk}$ j,k=1, 3 of the single homography matrix H is then generated as the average of the corresponding elements of the plurality of homography matrices $\{H_i\}_{i=1,n}$ such that $$h_{jk} = \frac{\sum_{i=1,n} h_{jk}^i}{n}$$

$$j, k = 1, 3.$$

Figure 7A:
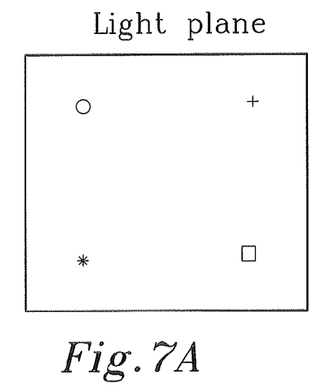
FIG. 7A to 7C illustrate how a plurality of fictive points in a light plane is mapped and used in an ideal sensor plane.
Figure 7B:
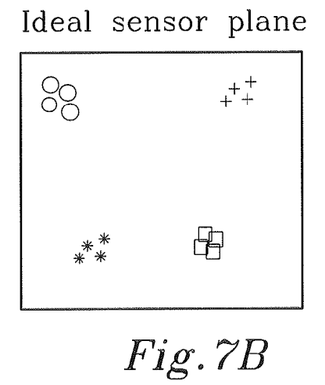
Figure 7C:
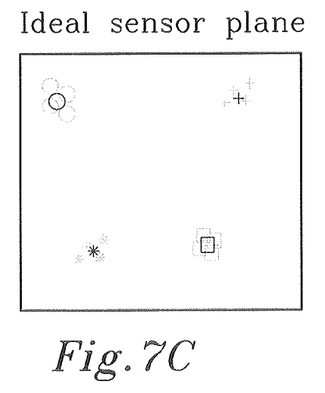

Optionally, the homography matrix H may be calculated by a procedure utilizing fictive points in the light plane 18. As such, a set of fictive points, which set includes at least four points having separate coordinates in the light plane, is selected. An example of such a set is presented in FIG. 7A which set includes exactly four points. Each one of the fictive points is then mapped to the sensor plane using each one of the homography matrices $\{H_i\}_{i=1,n}$. As such, each one of the fictive points is mapped to a number of n points in the sensor plane. Examples of such mappings for the set of fictive points illustrated in FIG. 7A are illustrated in FIG. 7B wherein each point in the aforesaid set has been mapped to the sensor plane by means of four separate homography matrices $\{H_i\}_{i=1,4}$. As may be gleaned from FIG. 7B, if the four separate homography matrices $\{H_i\}_{i=1,4}$ are different from one another, the four mappings of one fictive point will result in four separate points in the sensor plane 15. Next, the present implementation of the homography determination procedure proposes that an average point in the sensor plane is determined for the n mappings of each one of the fictive points. Examples of such averages are illustrated in FIG. 7C, illustrating the average point from the mappings to the sensor plane for each one of the fictive points. Thus, for the set of fictive points in the light plane 18, a corresponding set of points in the sensor plane 15 has been obtained, being the aforementioned averages. Since the set of fictive points includes at least four points, the homography matrix H may be calculated by conventional homography determination methods, such as for instance a direct linear transformation technique.

The procedure as defined with reference to FIG. 7A to FIG. 7C hereinabove may also be reversed such that a set of fictive points is selected in the sensor plane 15 instead and each one of the points in the aforesaid set is mapped to a number of n points in the light plane 18 by using the inverses of the individual separate homography matrices $\{H_i^{-1}\}_{i=1,4}$. Then a mean for each point may instead be formed in the light plane 18 and the homography matrix H may be determined in a similar manner as been described hereinabove with reference to FIG. 7A to FIG. 7C.

Figure 8A:
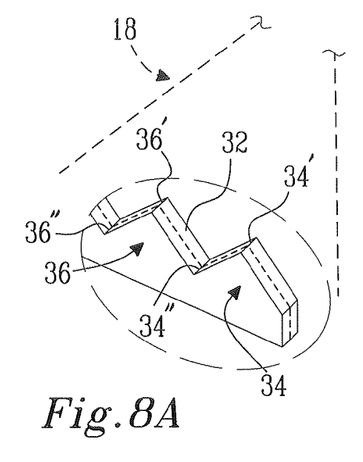
FIGS. 8A and 8B illustrate how a light plane intersects a calibration profile when the profile is parallel and tilted, respectively, with respect to the light plane.
Figure 8B:
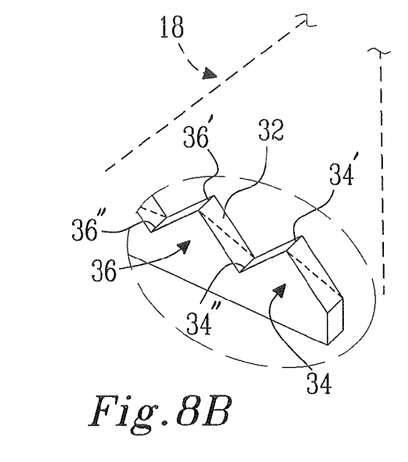

As may be realized when studying the sections hereinabove relating to the generation of at least one, but preferably a plurality of, homography matrices $\{H_i\}_{i=1,n}$ the accuracy of the relative distance between the points of the homography calibration profile 32 will have an influence on the accuracy of the homography matrices $\{H_i\}_{i=1,n}$. Although the relative distance between the points of the homography calibration profile 32 per se may be determined with high accuracy, there is a risk that a user, during the calibration method of the present invention, tilts the homography calibration profile 32 in relation to the light plane 18. The effect of such a tilt is illustrated in FIG. 8A and FIG. 8B, wherein FIG. 8A illustrates a position wherein the homography calibration profile 32 is substantially parallel to the light plane 18 whereas FIG. 8B illustrates a position wherein the homography calibration profile 32 is somewhat tilted in relation to the light plane 18. As may be realized when comparing the situations illustrated in FIG. 8A and FIG. 8B, the distance between, for instance, the peak 34' and the valley 34" in the light plane is somewhat larger in the position illustrated in FIG. 8B as compared to the position illustrated in FIG. 8A. As such, if the position illustrated in FIG. 8B is used when performing the homography determination, there is a risk that the obtained homography matrix H may be impaired.

As such, it would be desirable to compensate for any tilts of the calibration profile 32 in relation to the light plane 18 before the homography matrix H is determined. To this end, the inventors of the present invention have realized that the aforementioned tilt may be determined by using a homography calibration profile 32 such as the one illustrated in FIG. 9.

Figures 9, 10:
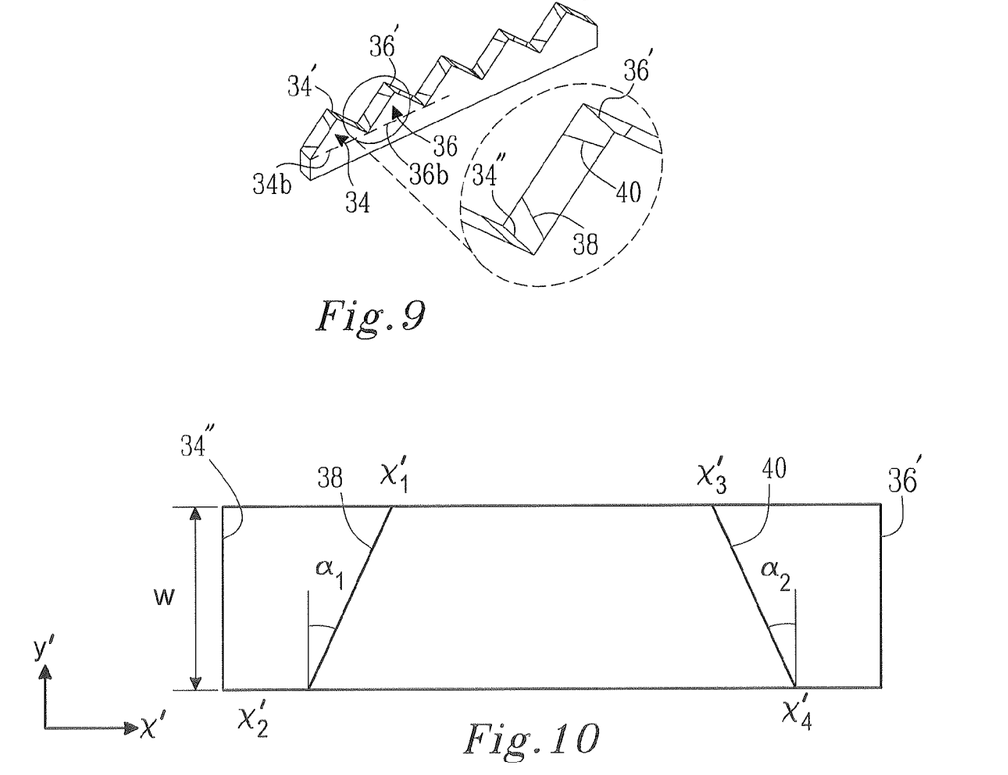
FIG. 9 illustrates a homography calibration profile according to the present invention.
FIGS. 10 and 11 illustrate a portion of the FIG. 9 homography calibration profile.

As may be gleaned from FIG. 9, the homography calibration profile 32 extends in a longitudinal x' and a vertical z' dimension forming a profile calibration plane P'. Moreover, the FIG. 9 homography calibration profile 32 comprises a plurality of teeth 34, 36, wherein each one of said teeth comprises a base portion 34b, 36b which extends in the calibration plane P' towards a peak portion 34', 36'. The profile calibration plane P' is adapted to be substantially parallel with the light plane 18 when the homography profile 32 is in a homography position. Moreover, the homography calibration profile 32 extends in a transversal dimension y' being substantially perpendicular to the profile calibration plane P'. The homography calibration profile 32 further comprises at least two straight control lines 38, 40 wherein each one of the control lines 38, 40 forms an angle with the transversal dimension. Purely by way of example, the control lines 38, 40 may be painted on the homography calibration profile 32 with a color which makes the control lines 38, 40 clearly distinguishable from the rest of the homography calibration profile 32. Optionally, the homography calibration profile 32 may be designed such that each one of the peaks 34', 36' forms an angle with the transversal dimension y', i.e. such that the peaks 34', 36' are inclined with respect to the transversal dimension y' (not shown).

The FIG. 9 homography calibration profile 32 is located on a calibration object 30. The surface of the calibration object 30 opposite of the calibration profile 32 is flat and may thus be used as a mapping calibration profile 28.

FIG. 10 illustrates a top view of a portion of the FIG. 9 homography calibration profile 32 and as may be gleaned from FIG. 10 the first control line 38 forms a first angle $\alpha_1$ with respect to the transversal dimension y' and the second control line forms a second angle $\alpha_2$ with respect to the transversal dimension y'.

The first and second angles $\alpha_1$, $\alpha_2$ may be determined according to the following:

$$\alpha_1 = \arctan\left(\frac{x_1' - x_2'}{w}\right), \qquad \text{Eq. 25}$$

and $$\alpha_2 = \arctan\left(\frac{x_3' - x_4'}{w}\right). \qquad \text{Eq. 26}$$

Figure 11:
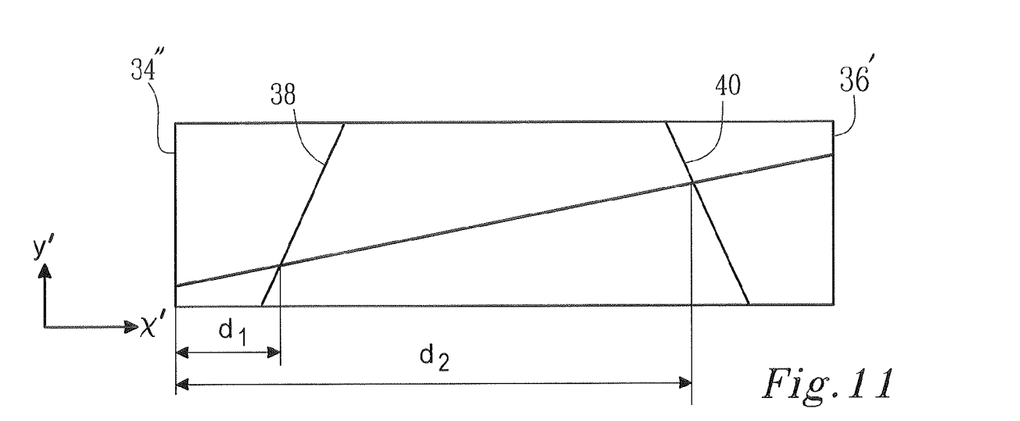
Figure 12:
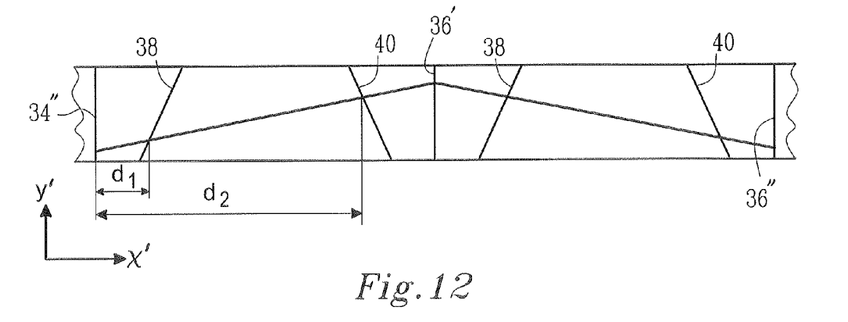
FIG. 12 illustrates a portion of the FIG. 9 homography calibration profile when inserted in the light plane.

The parameters $x'_1$, $x'_2$, $x'_3$ and $x'_4$ correspond to the end points of the first and second control lines 38, 40, c.f. FIG. 10, and w is the thickness, i.e. extension in the transversal dimension y', of the homography calibration profile 32. When the light plane hits the portion of the homography calibration profile 32 illustrated in FIG. 10, a first and a second portion distance $d_1$, $d_2$ may be determined and used when determining the tilt of the homography calibration profile 32 in relation to the light plane 18. The first portion distance $d_1$ is defined as the distance in the light plane 18 from the valley 34" to the first control line 38 and the second portion distance $d_2$ is defined as the distance from the valley 34" to the second control line 40. The first and second portion distances $d_1$, $d_2$ are illustrated in FIG. 11. Furthermore, FIG. 12 illustrates two parameters relating to the extension of the light plane 18 in relation to the homography calibration profile 32, namely an intersection $y'_1$ in the transversal dimension y' between the light plane 18 and an object on the homography calibration profile 32, which object in FIG. 12 is a valley 34", as well as the skew angle $\theta$, i.e. the angle between the laser plane 18 and the longitudinal dimension x'.

As may be realized by a person skilled in the art, the information as regards the skew angle $\theta$ may useful information when compensating for any tilt of the calibration plane P' in relation to the light plane 18 since the skew angle $\theta$ may in fact be used for obtaining the real distance between two points on the homography calibration profile 32 in the light plane, for instance the valley 34" and the peak 36'. If the first and second control lines 38, 40 are oriented such that $\alpha_1 = -\alpha_2 = \alpha$, the first and a second portion distance $d_1$, $d_2$ may be determined according to the following:

$$\theta = -\text{sgn}(\alpha)\arcsin\left(\frac{x_2' + x_4'}{R}\right) - \arctan\left(\frac{d_1 + d_2}{(d_1 - d_2)\tan(\alpha)}\right), \qquad \text{Eq. 27}$$

wherein $$R = \sqrt{(d_1 + d_2)^2 + (d_1 - d_2)^2 \tan^2(\alpha)}. \qquad \text{Eq. 28}$$

The operator $\text{sgn}(\alpha)$ as used in Eq. 27 above indicates the sign of the angle $\alpha$ such that $\text{sgn}(\alpha)=1$ for $\alpha \geq 0$ and $\text{sgn}(\alpha)=-1$ for $\alpha<0$. As may be realized from the above, the measure of the skew angle θ obtained from Eq. 27 and 28 is based on measurements from only a limited portion of the homography calibration profile 32. As such, in order to increase the accuracy of the compensation of the tilt of the calibration plane P' in relation to the light plane 18, measure data from a larger portion or even the whole of the homography calibration profile 32 is preferably used when determining the tilt compensation. An example of a method taking a large portion of the homography calibration profile 32 into account is presented hereinbelow.

Again, reference is made to FIG. 12 wherein the intersection $y'_1$ in the transversal dimension y' between the light plane 18 and an object on the homography calibration profile 32 is indicated. As previously indicated, the object on the homography calibration profile 32 may be the valley 34'', but an intersection is in fact also formed between the light plane 18 and the peak 36'. In the discussion hereinbelow, focus is made on determining the intersection $y'_1$ between the valley 34'' and the light plane 18 since the determination of the intersection $y'_1$ between the peak 36' and the light plane 18 may be performed in a similar manner.

First of all, it should be noted that, should the value of the intersection $y'_1$ between the valley 34'' and the light plane 18 be known, the first and a second portion distances $d_1$, $d_2$ in FIG. 12 may be determined by:

$$d_1 = \frac{x'_2 \cos(\alpha) - y'_1 \sin(\alpha)}{\cos(\theta - \alpha)}, \quad \text{Eq. 29}$$

and $$d_2 = \frac{x'_4 \cos(\alpha) + y'_1 \sin(\alpha)}{\cos(\theta + \alpha)}. \quad \text{Eq. 30}$$

As such, the value of the intersection $y'_1$ between the valley 34'' and the light plane 18 may be determined by the following expression:

$$y'_1 = \frac{x'_2 \cos(\alpha) - d_1 \cos(\theta - \alpha)}{\sin(\alpha)}. \quad \text{Eq. 31}$$

Figure 13:
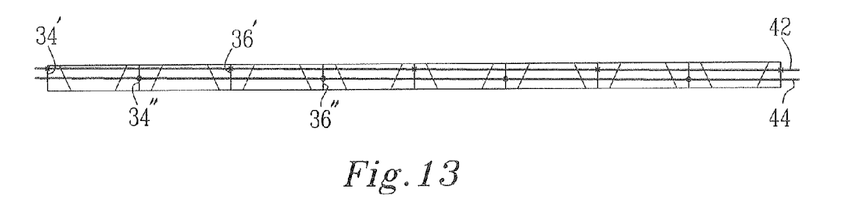
FIG. 13 illustrates the FIG. 9 homography calibration profile.

As previously discussed, a similar expression may be obtained mutatis mutandis for the intersection $y'_1$ between the peak 36' and the light plane 18. As such, the intersection $y'_1$ with the light plane 18 may be determined for a plurality of objects, such as a plurality of peaks and valleys, of the homography calibration profile 32. FIG. 13 is a top view of a homography calibration profile 32 wherein a plurality of intersections $y'_1$ has been determined, wherein each cross in FIG. 13 indicates an intersection $y'_1$ between a peak of the profile 32 and the light plane 18 and each circle indicates an intersection $y'_1$ between a valley and the light plane 18.

Thus, from the plurality of intersections between the peaks and the light plane 18, a first tilt line 42 may be generated which connects, at least in a least square sense, the aforesaid intersections, i.e. the crosses. In a similar manner, a second tilt line 44 may be generated which connects the intersections $y'_1$ between the valleys and the light plane 18.

Based on the information as regards the extension of the first and second tilt lines 42, 44, for instance the relative distance between the lines 42, 44 and the slopes of the lines, the tilt of the calibration plane P' in relation to the light plane 18 may be determined and this tilt may be compensated for when determining the homography H. It should be noted that in order to perform the compensation as presented hereinabove, the homography H is actually needed in order to determine e.g. the first and a second portion distances $d_1$, $d_2$. In order to overcome this problem, the inventors of the present inventions have realized that a first homography matrix $H^1$ may be determined without considering the aforementioned tilt and this first homography matrix $H^1$ is used for determining the tilt and obtaining a second homography matrix $H^2$ wherein the determined tilt has been taken into account. This procedure may be iterated n times until the elements in the homography matrix H have converged such that $H^{n-1} = H^n$ or wherein an error measure, for instance defined as $\|H^{n-1} - H^n\|$, is below a preferred value.

The presentation of the calibration method according to the present invention has so far used the assumption that the intrinsic parameters mapping K may be assumed to be a unity mapping such that K=I. However, in some applications of the calibration method of the present invention, there may be a need for determining the intrinsic parameters mapping K as well and examples of how this may be done is presented hereinbelow.

Figure 14:
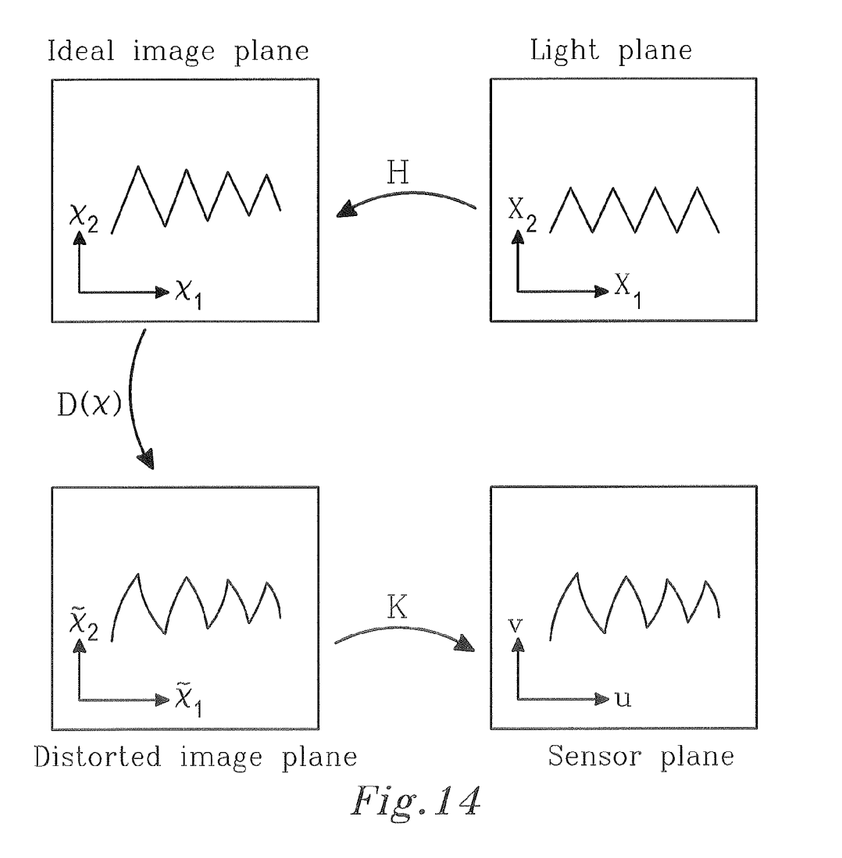
FIG. 14 is a schematic flow chart of mappings obtained from embodiments of the method of the present invention.

First of all, the mapping from the light plane 18 to the sensor plane 15 as stipulated by Eq. 1 is illustrated in FIG. 14, wherein each mapping K, D and H is illustrated. When comparing FIG. 2 and FIG. 13, it may be realized that the mapping according to the scheme illustrated in FIG. 13 includes the additional mapping K being the intrinsic parameters mapping K in order to map points in a distorted image plane to the sensor plane. Phenomena which may be captured by the intrinsic parameters mapping K include, but are not limited to, the shape and position of the sensor 14 in relation to the optics 22.

An intrinsic parameters mapping matrix K taking the aforementioned parameters into account may be formulated as:

$$K = \begin{bmatrix} \alpha_u & s & u_0 \\ 0 & \alpha_v & v_0 \\ 0 & 0 & 1 \end{bmatrix}, \quad \text{Eq. 32}$$

wherein $\alpha_u$, $\alpha_v$ define the scale in the u and v dimensions such that a geometric point in the distorted image plane is translated into a pixel in the sensor 14. The parameter s as defined hereinabove relates to a skewness of the sensor itself and is non-zero if the rows and columns of pixels constituting the sensor are not perpendicular. The parameters $u_0$ and $v_0$ relate to the principal point of the sensor. As may be realized by a person skilled in the art, any one of the parameters of K as defined in Eq. 32 may be determined in one or more additional steps of the calibration method of the present invention.

Figure 15:
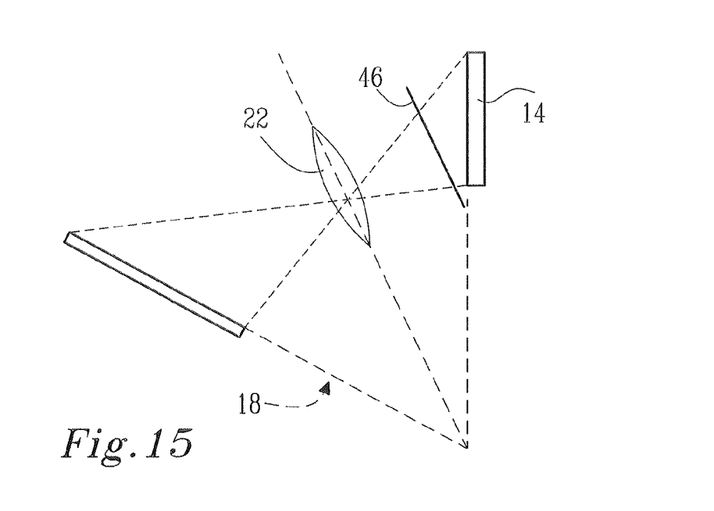
FIG. 15 is a schematic side view of a measuring system wherein its sensor is tilted with respect to its optics.

Moreover, in some measuring systems 10 the sensor 14 is actually tilted with respect to a plane defined by the optics 22, which plane generally is denominated a lens plane or focal plane and is defined as a plane extending perpendicularly to the principal axis of the optics 22. The purpose of the tilt is to obtain focus of a large portion of the light plane 18, preferably on the entire portion of the light plane 18 which is imaged by the sensor 14. An example of a measuring system 10 having a tilted sensor 14 is schematically illustrated in FIG. 15.

However, the embodiments of the calibration methods of the present invention have, at least implicitly, used the assumption that the sensor 14 is parallel to the lens plane. As such, in order to compensate for any tilt of the sensor 14 in relation to the lens plane, a fictive image plane 46 is firstly introduced which image plane 46 is parallel to the lens plane and the previous calibration methods may be regarded as methods providing appropriate mappings from the fictive image plane 46 to the light plane 18. The principle of tilting the sensor 14 in relation to the lens plane is sometimes referred to as the Scheimpflug principle.

In order to obtain a mapping from the light plane 18 to the sensor 14, there is a need for an additional homography between the image pane 44 and the sensor 14. This homography may be obtained by a similar method as the one presented hereinabove with respect to the light plane 18 and the ideal sensor plane and is thus not further explained here.

Further modifications of the invention within the scope are feasible. As such, the present invention should not be considered as limited by the embodiments and figures described herein. Rather, the full scope of the invention should be determined by the appended claims, with reference to the description and drawings.

The invention claimed is:

1. A method for calibrating a measuring system, which system comprises a light source, optics and a sensor, wherein said light source is adapted to produce a light plane and said optics is located between said light plane and said sensor, wherein the light plane is a plane of light, which light plane is formed by light rays that are confined in said light plane when emitted by the light source, wherein said method is performed in order to obtain a mapping from at least one point on said sensor to at least one point in said light plane, said method comprising the steps of:
   switching on said light source such that said light plane is produced;
   introducing a mapping calibration profile in a first mapping position in said light plane, wherein said mapping calibration profile comprises at least three points forming a straight line; characterized in that the method further comprises the steps of:
   computing a non-linear mapping from at least a first portion of said sensor to at least a first portion of said light plane by using said at least three points of said mapping calibration profile;
   introducing a homography calibration profile in a first homography position in said light plane, wherein said homography calibration profile comprises at least four points the relative distance between which are predetermined, and
   computing a homography from at least a first portion of said sensor to at least a first portion of said light plane based on said at least four points of said homography calibration profile.

2. The method according to claim 1, wherein said method further comprising the steps of:
   altering the position of said mapping profile to successive mapping positions, and
   using information as regards said at least three points of said mapping calibration profile from each one of said successive mapping positions in order to compute said non-linear mapping.

3. The method according to claim 2, wherein said step of altering the position of said mapping profile to said plurality of successive mapping positions is performed such that said successive mapping positions are selected randomly.

4. The method according to claim 1, wherein said method further comprising the steps of:
   altering the position of said homography profile to successive homography positions, and
   using information as regards said at least four points of said homography calibration profile from each one of said successive homography positions in order to compute said homography.

5. The method according to claim 4, wherein said step of altering the position of said homography profile to said plurality of successive homography positions is performed such that said successive homography positions are selected randomly.

6. The method according to claim 1, wherein said mapping calibration profile comprises a planar surface on which said at least three points are located.

7. The method according to claim 1, wherein said homography calibration profile comprises a saw-toothed portion with predetermined dimensions, wherein at least four points are located on said saw-toothed portion.

8. The method according to claim 1, wherein said homography calibration profile extends in a longitudinal and a vertical dimension forming an profile calibration plane, wherein said profile calibration plane is adapted to be parallel with said light plane when said homography profile is in a homography position, said homography calibration profile further extending in a transversal dimension being perpendicular to said profile calibration plane, said homography calibration profile further comprising at least two straight control lines, wherein each one of said control lines forms an angle with said transversal dimension, said method further comprising a step of determining a measure of a profile tilt of said profile calibration plane in relation to said light plane by utilizing said control lines.

9. The method according to claim 8, wherein in said method further comprises a step of compensating for said profile tilt when computing said homography.

10. The method according to claim 1, wherein said optics comprises an optical axis and said sensor extends in a plane with a sensor normal direction and wherein said optical axis forms a Scheimpflug angle with said sensor normal direction, wherein said method further comprises a step compensating for said Scheimpflug angle when generating said mapping from at least one point on said sensor to at least one point in said light plane.

11. The method according to claim 1, wherein said light source is a laser source such that said light plane is a laser plane.

12. The method according to claim 1, wherein said mapping calibration profile and said homography calibration profile are located on a single calibration object.

13. Computer program comprising computer program code executable in a computer or a processor, said computer program being adapted to receive a signal from a sensor of a measuring system, said measuring system further comprising a light source and optics, said light source being adapted to produce a light plane and said optics being located between said light plane and said sensor, wherein the light plane is a plane of light, which light plane is formed by light rays that are confined in said light plane when emitted by the light source, said computer program being storable on a computer-readable storage medium, said computer program being adapted to, when executed in a computer or processor, implement the following steps:
   storing a mapping image recorded by said sensor of a mapping calibration profile located in a first mapping position in said light plane, wherein said mapping calibration profile comprises at least three points forming a straight line;
   storing a homography image recorded by said sensor of a homography calibration profile located in a first homography position in said light plane, wherein said homography calibration profile comprises at least four points the relative distance between which are predetermined;

computing a non-linear mapping from at least a first portion of said sensor to at least a first portion of said light plane by using said mapping image comprising at least three points of said mapping calibration profile, and computing a homography from at least a first portion of said sensor to at least a first portion of said light plane by using said homography image comprising said at least four points of said homography calibration profile.

14. Electronic control unit comprising computer program code executable in a computer or a processor, said computer program being adapted to receive a signal from a sensor of a measuring system, said measuring system further comprising a light source and optics, said light source being adapted to produce a light plane and said optics being located between said light plane and said sensor, wherein the light plane is a plane of light, which light plane is formed by light rays that are confined in said light plane when emitted by the light source, said computer program being storable on a computer-readable storage medium, said computer program being adapted to, when executed in a computer or processor, implement the following steps:

storing a mapping image recorded by said sensor of a mapping calibration profile located in a first mapping position in said light plane, wherein said mapping calibration profile comprises at least three points forming a straight line;

storing a homography image recorded by said sensor of a homography calibration profile located in a first homography position in said light plane, wherein said homography calibration profile comprises at least four points the relative distance between which are predetermined;

computing a non-linear mapping from at least a first portion of said sensor to at least a first portion of said light plane by using said mapping image comprising at least three points of said mapping calibration profile, and computing a homography from at least a first portion of said sensor to at least a first portion of said light plane by using said homography image comprising said at least four points of said homography calibration profile.

15. A measuring system comprising a light source, optics and a sensor, wherein said light source is adapted to produce a light plane and said optics is located between said light plane and said sensor, wherein the light plane is a plane of light, which plane is formed by light rays that are confined in said plane when emitted by the light source, characterized in that said measuring system comprises an electronic control unit comprising computer program code executable in a computer or a processor, said computer program being adapted to receive a signal from a sensor of a measuring system, said measuring system further comprising a light source and optics, said light source being adapted to produce a light plane and said optics being located between said light plane and said sensor, said computer program being storable on a computer-readable storage medium, said computer program being adapted to, when executed in a computer or processor, implement the following steps:

storing a mapping image recorded by said sensor of a mapping calibration profile located in a first mapping position in said light plane, wherein said mapping calibration profile comprises at least three points forming a straight line;

storing a homography image recorded by said sensor of a homography calibration profile located in a first homography position in said light plane, wherein said homography calibration profile comprises at least four points the relative distance between which are predetermined;

computing a non-linear mapping from at least a first portion of said sensor to at least a first portion of said light plane by using said mapping image comprising at least three points of said mapping calibration profile, and computing a homography from at least a first portion of said sensor to at least a first portion of said light plane by using said homography image comprising said at least four points of said homography calibration profile.

\* \* \* \* \*